United States Patent [19]
DeNicolo et al.

[11] Patent Number: 5,864,960
[45] Date of Patent: Feb. 2, 1999

[54] GOLF CLUB FITTING SYSTEM AND METHOD OF USING SAME

[75] Inventors: Clifford D. DeNicolo, San Diego; Bradley J. Denny, San Marcos; Kenneth R. Russell, Encinitas, all of Calif.

[73] Assignee: Zevo Golf Co., Inc., Temecula, Calif.

[21] Appl. No.: 787,909

[22] Filed: Jan. 23, 1997

[51] Int. Cl.⁶ .............................. G01B 7/00; A63B 69/36
[52] U.S. Cl. ........................... 33/508; 473/131; 473/409; 702/127
[58] Field of Search ..................... 33/508, 534; 473/131, 473/282, 295, 296, 407, 409; 702/33, 127

[56] References Cited

U.S. PATENT DOCUMENTS

| | | | |
|---|---|---|---|
| 3,953,033 | 4/1976 | Kelly et al. | 33/508 |
| 4,104,802 | 8/1978 | Johnston | 33/508 |
| 4,788,774 | 12/1988 | Boone | 33/508 |
| 4,885,847 | 12/1989 | Korfanta | 33/508 |
| 5,469,627 | 11/1995 | Denny et al. | 33/508 |

*Primary Examiner*—Christopher M. Fulton
*Attorney, Agent, or Firm*—Higgs, Fletcher & Mack LLP; Bernard L. Kleinke

[57] ABSTRACT

A golf club fitting system and method relate to the use of a golf club having its head rockably mounted on a base to enable the user to position the head adjustably. A club head orientation sensing device determines the loft angle of the club face when disposed in the desired adjusted position. A microcomputer responds to the sensor indicating the measured loft angle and other parameters such as the right handed or left handed user information and the intended playing surface condition information. A device responds to the microcomputer to display the determined loft angle desired for the given user.

22 Claims, 14 Drawing Sheets

| FIGURE 6A | FIGURE 6B | FIGURE 6C |
|---|---|---|
| FIGURE 6F | FIGURE 6E | FIGURE 6D |
| FIGURE 6G | FIGURE 6H | FIGURE 6I |

FIGURE 6

GOLF CLUB FITTING SYSTEM AND METHOD OF USING SAME

1. Technical Field

The present invention relates in general to a golf club fitting system and method of using it. It more particularly relates to a system for fitting a golf club such as a putter to a user.

2. Background Art

In sporting games such as golf, the selection of a golf club to suit the characteristics of a particular player, as well as the playing conditions, is important for enabling the player to perform at high levels of performance. In order to help facilitate the proper selection of a golf club for the player, a system has been developed for assisting in the selection of a golf putter which is constructed in a manner to help enhance the performance of the player in his or her putting game. In this regard, reference may be made to U.S. Pat. No. 5,469,627, which is incorporated herein by reference.

In the patented putter fitting system, a putter having an adjustable length shaft was provided to the user, and the user was asked to assume his or her natural putting stance. The length of the putter shaft was then adjusted to a length which was desirable for the player. An electrical measuring device measured the adjusted length of the putter shaft and displayed the length on a read-out display.

The putter used for the fitting purposes was provided with a head which was pivotally connected to the shaft so that when the player assumed the putting stance, the lie angle of the club head relative to the shaft was adjusted to the position desired by the player. An electrical lie angle measuring device determined the lie angle between the putter shaft and the head when it was in its desired adjusted position. The lie angle was then displayed to the user.

By knowing the desired shaft length and lie angle from the convenient displays, a putter could then be readily selected which closely approximated that of the desired shaft length and lie angle.

While such a system has proven to be highly successful, it would also be useful to enable the user to be either left handed or right handed. In this regard, such a system should also be able to take the necessary measurements for a left handed player without the necessity of having another fitting system for left handed persons.

Therefore, it would be highly desirable to have such a golf club fitting system which not only measures the shaft length and lie angle, but also takes into account whether or not the person is left or right handed.

Additionally, it would be highly desirable to have such a system which also takes into account the type of putter desired. In this regard, the player may prefer either a heel shafted putter or a face shafted putter. Thus, it would be very worthwhile to also take into account the type of putter desired, in addition to the shaft length, lie angle and whether the user is right or left handed.

While the construction of the putter and the type of the putter is very important, the intended playing conditions should also somehow be taken into account in the selection of the putter for the particular player. For example, in the game of golf, putters are intended to be used on a golf green which typically has very short and smooth turf to facilitate the rolling movement of the ball therealong and into the cup. However, some greens are "fast" and some are "slow." The fast greens are the more desirable ones usually, and are very carefully groomed to maintain highly desirable playing conditions. The slow greens are ordinarily less desirable, and can result from undesirable playing conditions, such as standing water or improperly groomed turf.

Therefore, a new and improved putter fitting system should not only take into account the construction of the putter, as well as the type of the putter, as well as whether the player is right or left handed, but also it would somehow be highly advantageous to have a golf club fitting system which also takes into account the intended playing conditions for a given player.

SUMMARY OF THE INVENTION

Therefore, the principal object of the present invention is to provide a new and improved golf club fitting system and method of using it, wherein the system can take into account various different parameters for a given player.

Another object of the present invention is to provide such a new and improved golf club fitting system and method, which determines the kind of golf club depending upon whether the user is right handed or left handed.

Still another object of the present invention is to provide such a new and improved golf club fitting system and method, which also determines the type of golf club for a given user, depending upon whether the club is heel shafted or face shafted.

A further object of the present invention is to provide a new and improved golf club fitting apparatus and method, which also determines a golf club for a given user based upon the intended use such as the type of playing surface.

Briefly, the above and further objects of the present invention are realized by providing a new and improved golf club fitting system and method, which recommends certain golf clubs based on a variety of parameters. The parameters include shaft length and lie angle measurements, right or left handed user information, club style and the intended use.

A golf club fitting system and method relate to the use of a golf club having its head rockably mounted on a base to enable the user to position the head adjustably. A club head orientation sensing device determines the loft angle of the club face when disposed in the desired adjusted position. A microcomputer responds to the sensor indicating the measured loft angle and other parameters such as the right handed or left handed user information and the intended playing surface condition information. A device responds to the microcomputer to display the determined loft angle desired for the given user.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein:

FIG. 6 is a diagrammatic representation illustrating the relationship of FIGS. 6A–6I;

BEST MODE FOR CARRYING OUT THE INVENTION

Figure 1:
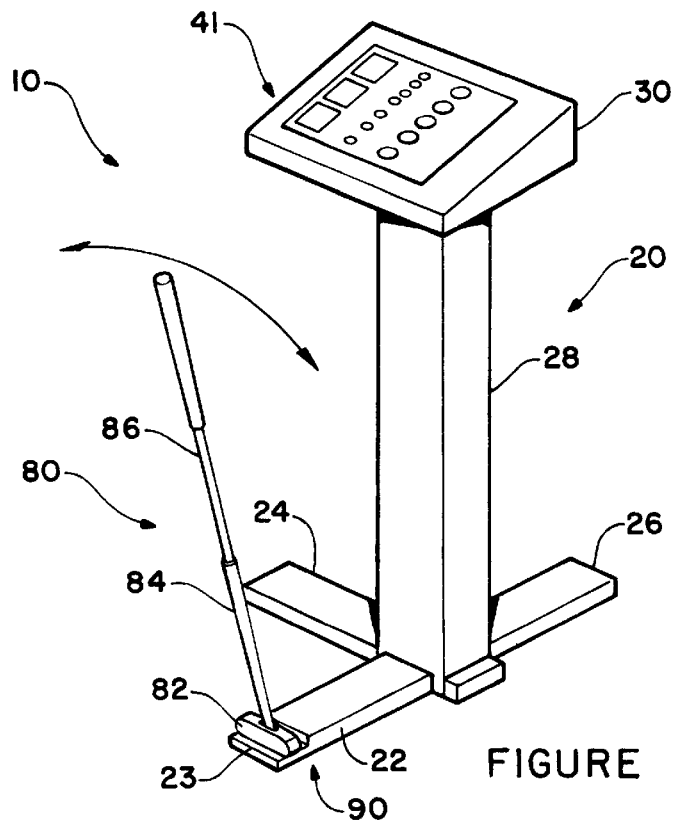
FIG. 1 is a perspective view of a golf club fitting system, which is constructed in accordance with the present invention.

Referring now to the drawings, and more particularly to FIG. 1 thereof, there is shown a golf club fitting system 10 which is constructed in accordance with the present invention. The system 10 can be used to facilitate the selection of a desired golf club construction for a user, wherein the parameters of the desired golf club construction are particularly suited for the user.

In the preferred embodiment of the invention, the system 10 is used to facilitate the selection of a putter. However, it will be understood by one skilled in the art that the system 10 could also be used to facilitate the selection of other golf clubs including drivers and irons.

The parameters of the golf club include the length of the putter shaft, the lie angle of the club head of the putter relative to the shaft, and the loft angle of the putter club face. Typically, each style of putter is manufactured in a number of models, each model having a particular combination of parameters associated therewith to accommodate golfers of various physical characteristics. Thus, to select a putter having the desired parameters which correspond to the physical characteristics of the golfer to be fitted with a club, the desired shaft length, lie angle and club face loft angle must be determined for the individual golfer to enable the desired putter to be selected.

The system 10 enables a user, such as a golfer, to determine the proper shaft length, lie angle and club face loft angle suitable for the user, and includes a stand or base 20 to support or mount the system 10 on a supporting surface, and an adjustable golf club 80 mounted rockably on the base 20 in a substantially upright playing position. A microcomputer 110 (FIG. 6F) receives measurement information indicative of the adjustable club shaft length and lie angle to enable the length and lie angle parameters for the user to be displayed on a user/computer interface 41 to facilitate the selection of a desired putter having the displayed length and lie angle parameters.

The system 10 further includes a sensor device 90 for cooperating with the adjustable club 80 to facilitate the determination of a desired club face loft angle which is particularly suited for the user. The sensor device 90 provides adjusted loft angle information to the microcomputer 110 to enable it to determine an appropriate club face loft angle for the user. Club selection variables, such as the playing position of the user (e.g., whether the user is right or left handed), the putter style (face balanced or heel shafted), and the typical green speed (fast, medium or slow) which the user most often encounters, can be input via the interface 41 to be used by the microcomputer 110 to facilitate the determination of a desired left angle for the user.

In use, the user assumes a position behind the adjustable club 80 and grips the club 80 as though the user were addressing a golf ball during normal golf play. In this regard, the user adjusts the club length and lie angle as required to suit the physical characteristics of the user. The adjusted club length and lie angle are measured, and information indicative of the measurements is provided to the microcomputer 110.

The club 80 is further adjusted rockably by the user to an adjusted loft angle which is also characteristic of the particular user. Additional input regarding club variables that affect the selection of a desired left angle, such as playing position, putter style and green speed are input through the interface 41. The adjusted loft angle of the club 80 is sensed by the sensor device 90 to generate information indicative of the adjusted loft angle for the club 80.

The microcomputer 110 utilizes the information indicative of the adjusted shaft length, adjusted lie angle and adjusted loft angle, in combination with the variable information input by the user, to determine a desired shaft length, desired lie angle and a desired loft angle for a putter which is custom fitted to the particular user. The desired shaft length, lie angle and loft angle are displayed by the interface 41 to enable the user to select the desired golf club.

Considering now the golf club fitting system 10 in greater detail, the base 20 includes three support legs 22, 24 and 26 extending radially outwardly from an upright post 28 to stabilize, support or mount the system 10 on the supporting surface. A compartment 30 is mounted to an upper end of the post 28 to support and position the interface 41 at a comfortable level for a majority of users. Preferably, the surface of the compartment 30 receiving the interface 41 thereon is somewhat angled toward the user standing behind the club 80 to facilitate the use of the interface 41.

The interface 41 (FIG. 2) includes pushbutton switches 43, 45, 47, 49 and 51 to enable the user to select desired variables to be used by the microcomputer 110 in determining the desired shaft length, lie angle and loft angle. In this regard, the switches 43 and 45 enable the user to select the playing position and putter style, respectively, preferred by the user. The switches 47, 49 and 51 enable the user to select one of three green speeds for use by the microcomputer 110, e.g., a fast green speed, a medium green speed or a slow green speed. The green speed is selected according to the type of green that the user normally encounters. However, if desired, the green speed may be selected for a specific type of green only.

A plurality of displays 53, 55, 57, 59, 61, 63 and 65 indicate the variables selected by the user. For example, the switch 43 may be toggled between a right handed and a left handed playing position, wherein either the display 53 or 55 will be illuminated. Similarly, the switch 45 can be toggled between a face balanced putter style and a heel shafted putter style to illuminate either the display 57 or 59. To select a green speed, the user selects one of switches 47, 49 and 51, wherein one of the displays 61, 63 and 65 associated with the selected green speed is illuminated. The interface 41 further includes displays 67, 69 and 71 to indicate the desired shaft length, lie angle and loft angle as determined by the microcomputer 110.

The club 80 includes a club head 82 mounted rockably to the leg 22 at an end portion 23 thereof. A fixed length shaft portion 84 is coupled pivotally to the club head 82 to enable the lie angle of the club 80 to be adjusted. A telescoping shaft portion 86 is received within the fixed shaft portion 84, and can be adjusted relative to the fixed shaft portion 84 to define an overall adjusted shaft length for the club 80. A shaft length and lie angle detection circuit is coupled to the club 80 to measure and generate an adjusted length signal and an adjusted lie angle signal. The club 80 and the detection circuit (not shown) is described in greater detail in U.S. Pat. No. 5,469,627, which is incorporated by reference as if fully set forth herein.

Figure 3A:
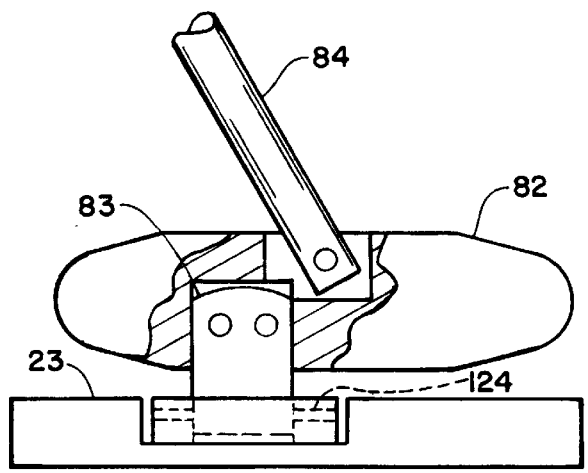
FIG. 3A is a partially cut-away diagrammatic view of an adjustable golf club of the system of FIG. 1.
Figure 3B:
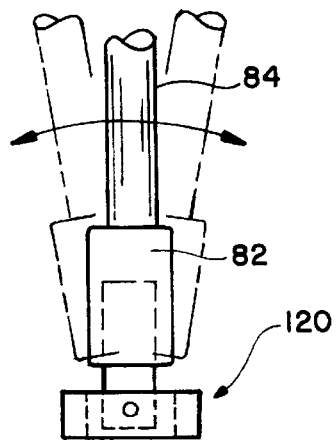
FIG. 3B is a diagrammatic view of the adjustable golf club of FIG. 3A illustrating pivoting movement of the golf club.
Figure 4A:
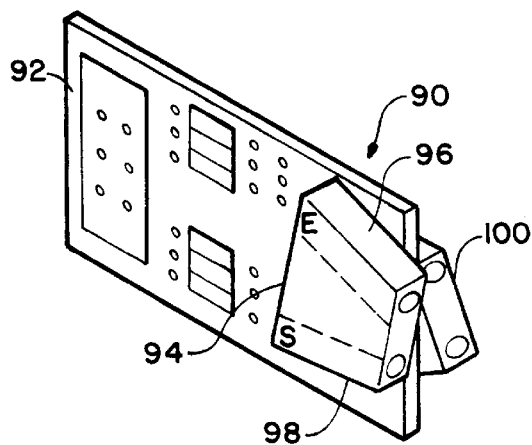
FIG. 4A is a perspective view of a sensor device.
Figure 3C:
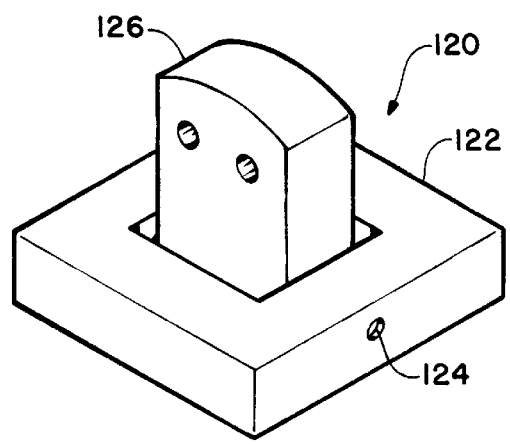
FIG. 3C is a perspective view of a gimbal device.

To facilitate the determination of an adjusted loft angle for the club 80, the system 10 further includes a gimbal assembly 120 (FIGS. 3A–3C) coupled between the end portion 23 and the club head 82. As best seen in FIG. 1, the leg 22 is stepped down at end portion 23 to form a shoulder. The gimbal assembly is spaced apart from the shoulder to enable the club 80 to pivot (FIG. 3B). The gimbal assembly 120 includes a gimbal base member 122 which is adapted to be received in a snug manner within an opening (not shown) in the end portion 23. A pivoting block member 126 is received within an opening in the base member 122 and is coupled pivotally by a pivot pin 124 to the base member 122 to permit the block member 126 to pivot within the base member opening. The block member 126 is received within a notch 83 in the club head 82, and secured therein, to enable the club 80 to pivot relative to the end portion 23.

An alignment mechanism (not shown) maintains the club 80 with the club head 82 in the neutral loft angle position. For example, opposing springs engaging the block 126 and the base member 122 can be used to align the block 126, and thus the club 80, vertically upright.

For reference purposes, the positioning of the golf club 80 in a substantially vertical position positions the club head 82 in a neutral position. Pivoting the club 80 toward the base 20 positions the club head 82 in a positive position and pivoting the club 80 away from the base positions the club head 82 in a negative position. Thus, the sensor device 90 determines which position the club head is in (neutral, positive or negative) to generate the adjusted left angle signal.

Figure 6A:
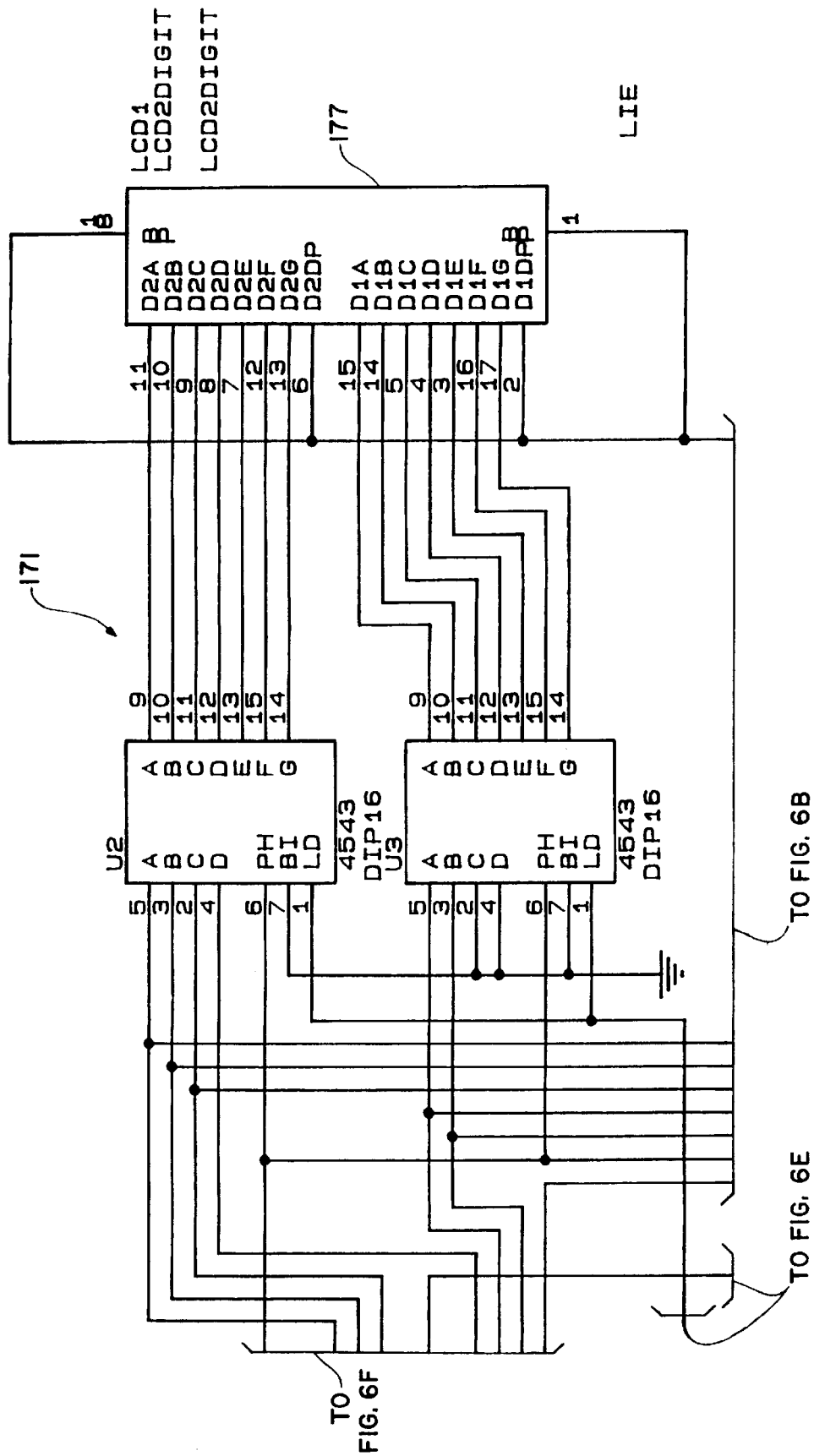
FIGS. 6A–6I are schematic diagrams of an electrical circuit for determining parameters for a desired golf club.
Figure 6B:
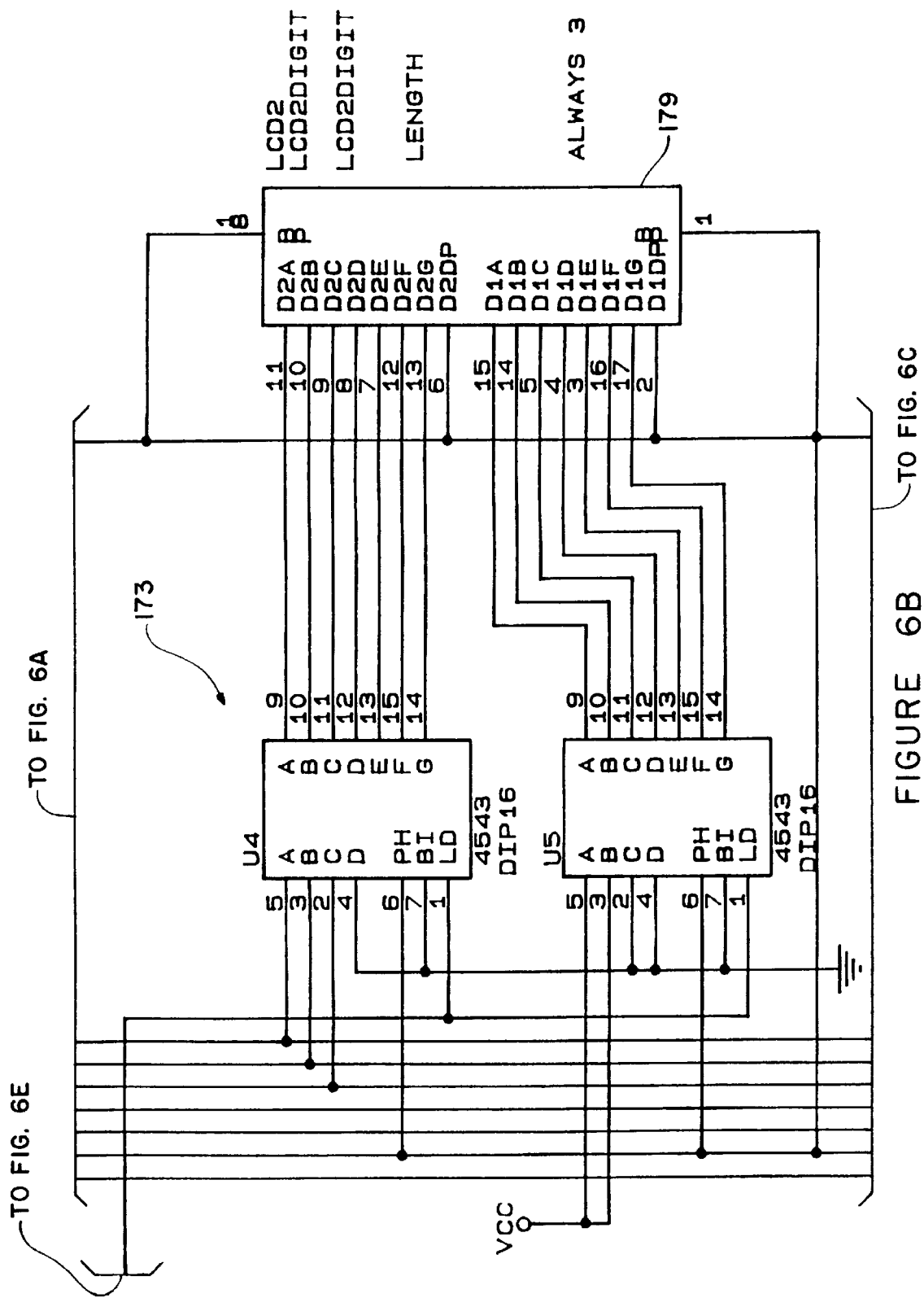
Figure 6C:
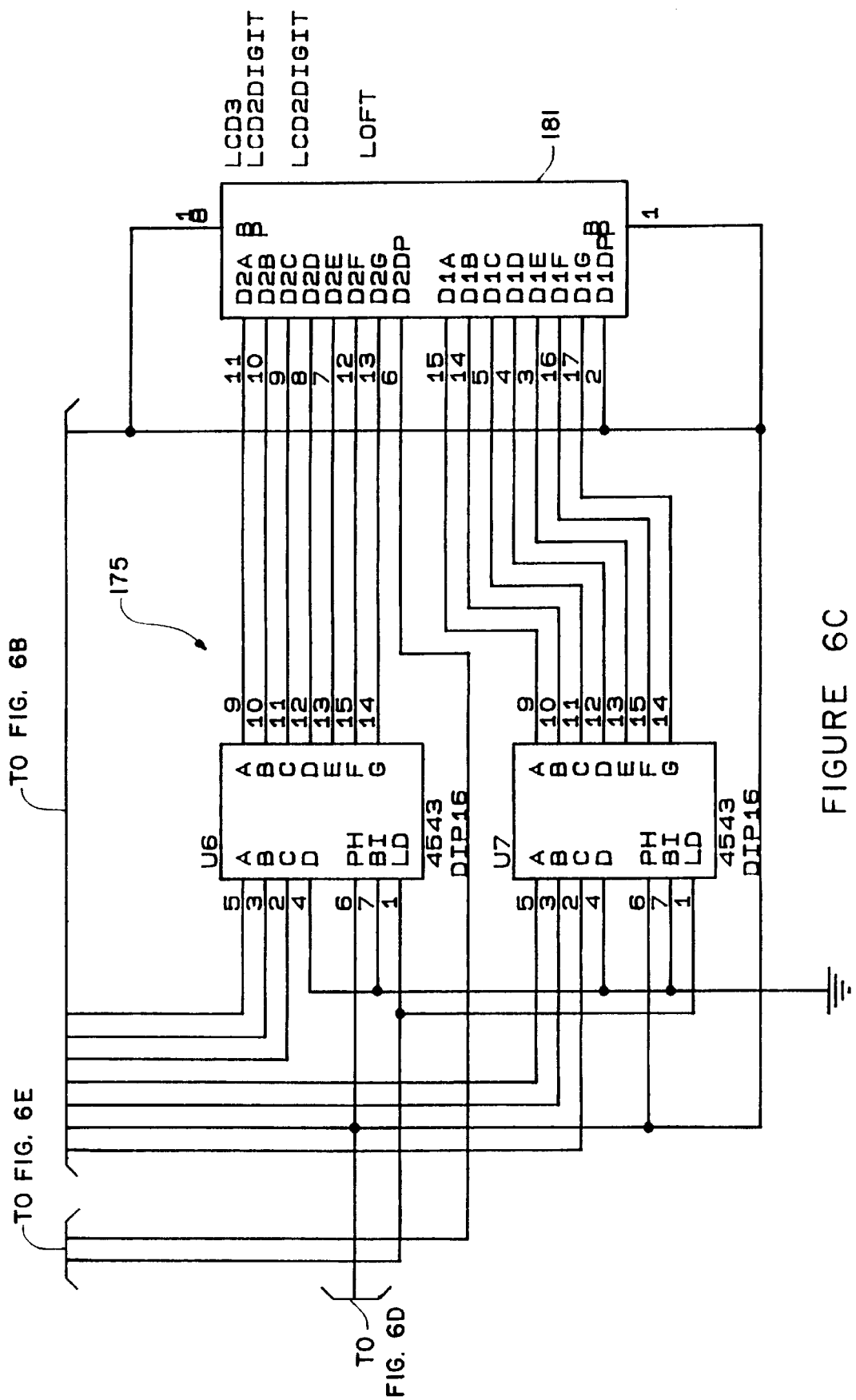
Figure 6D:
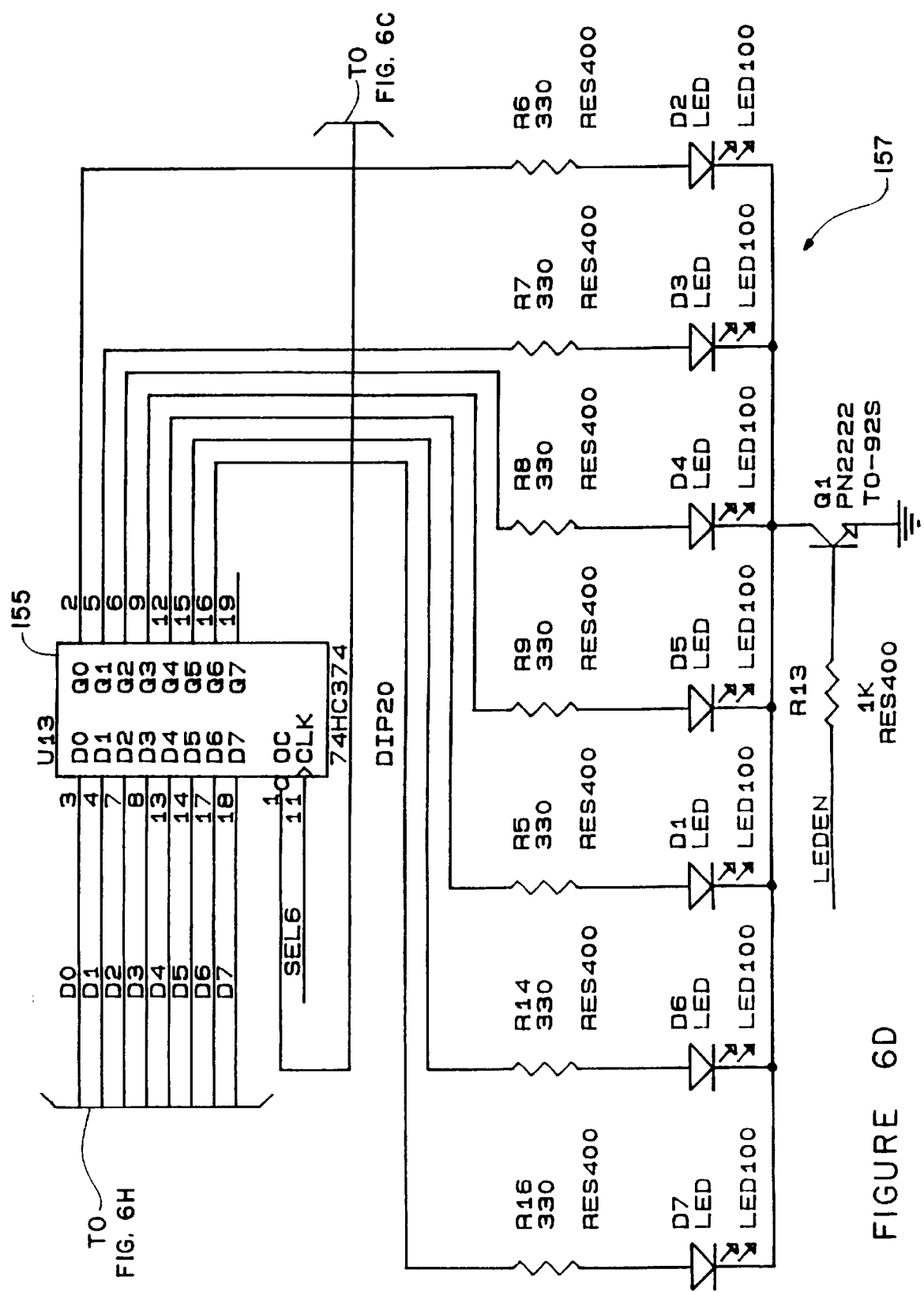
Figure 6E:
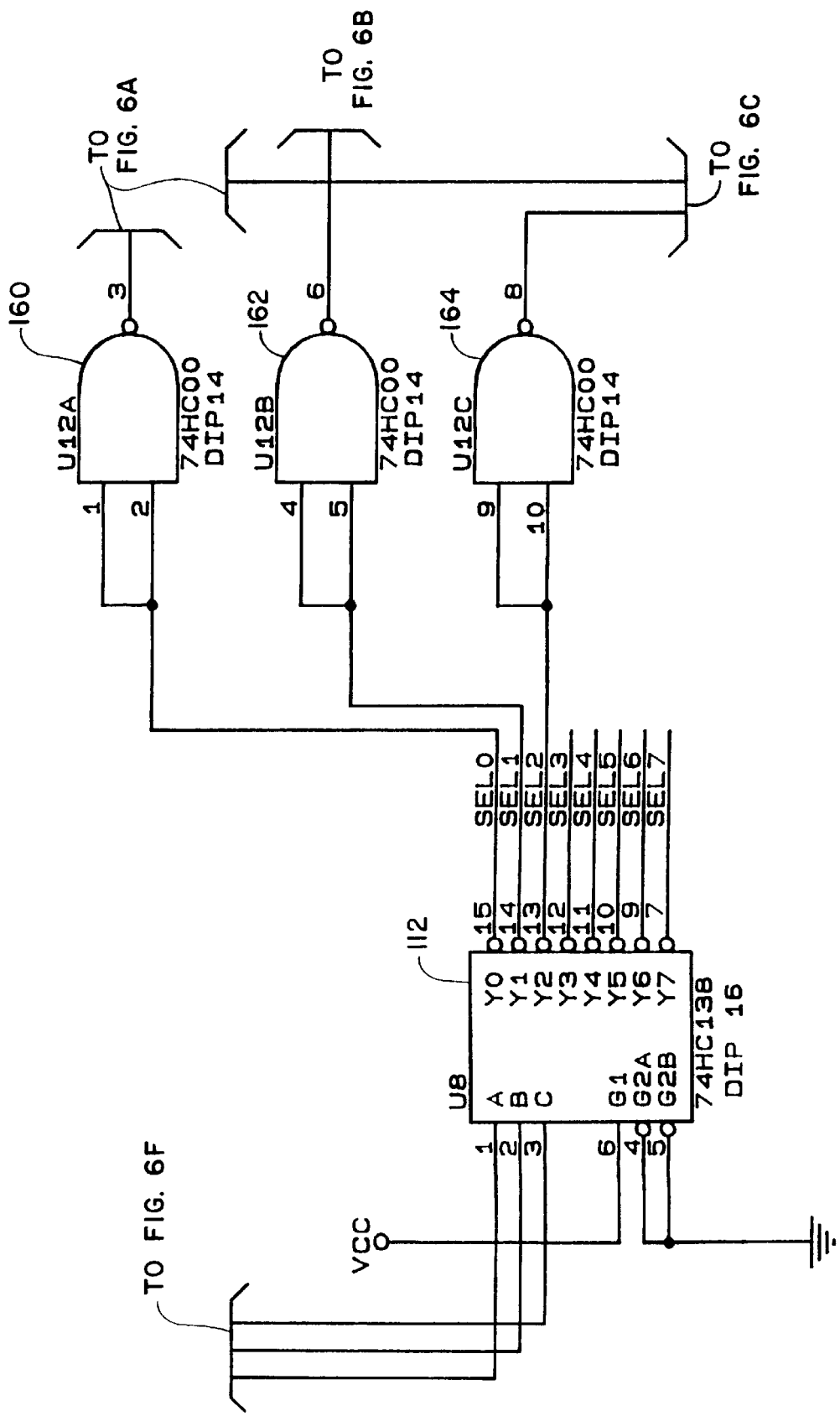
Figure 6F:
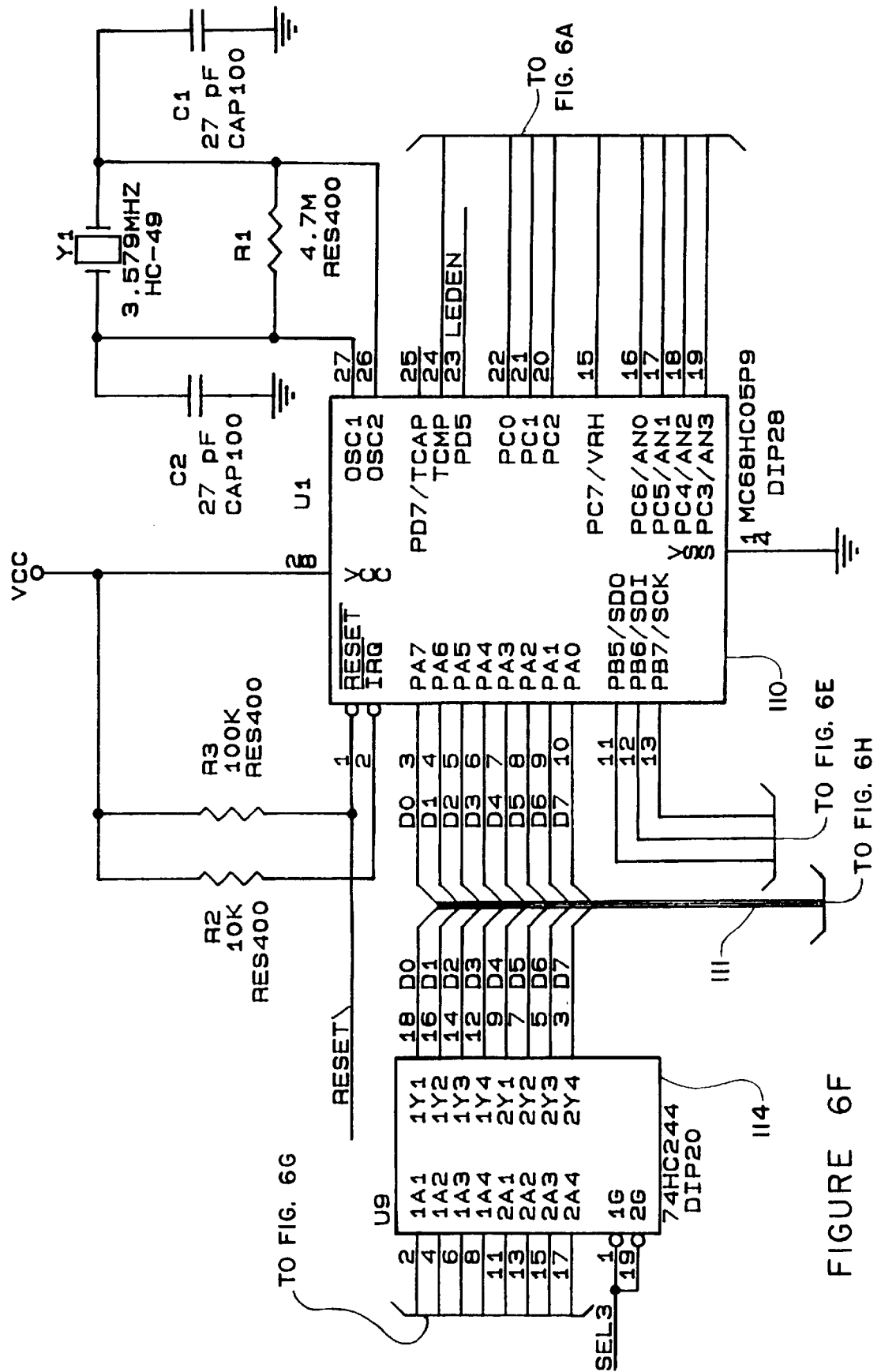
Figure 6G:
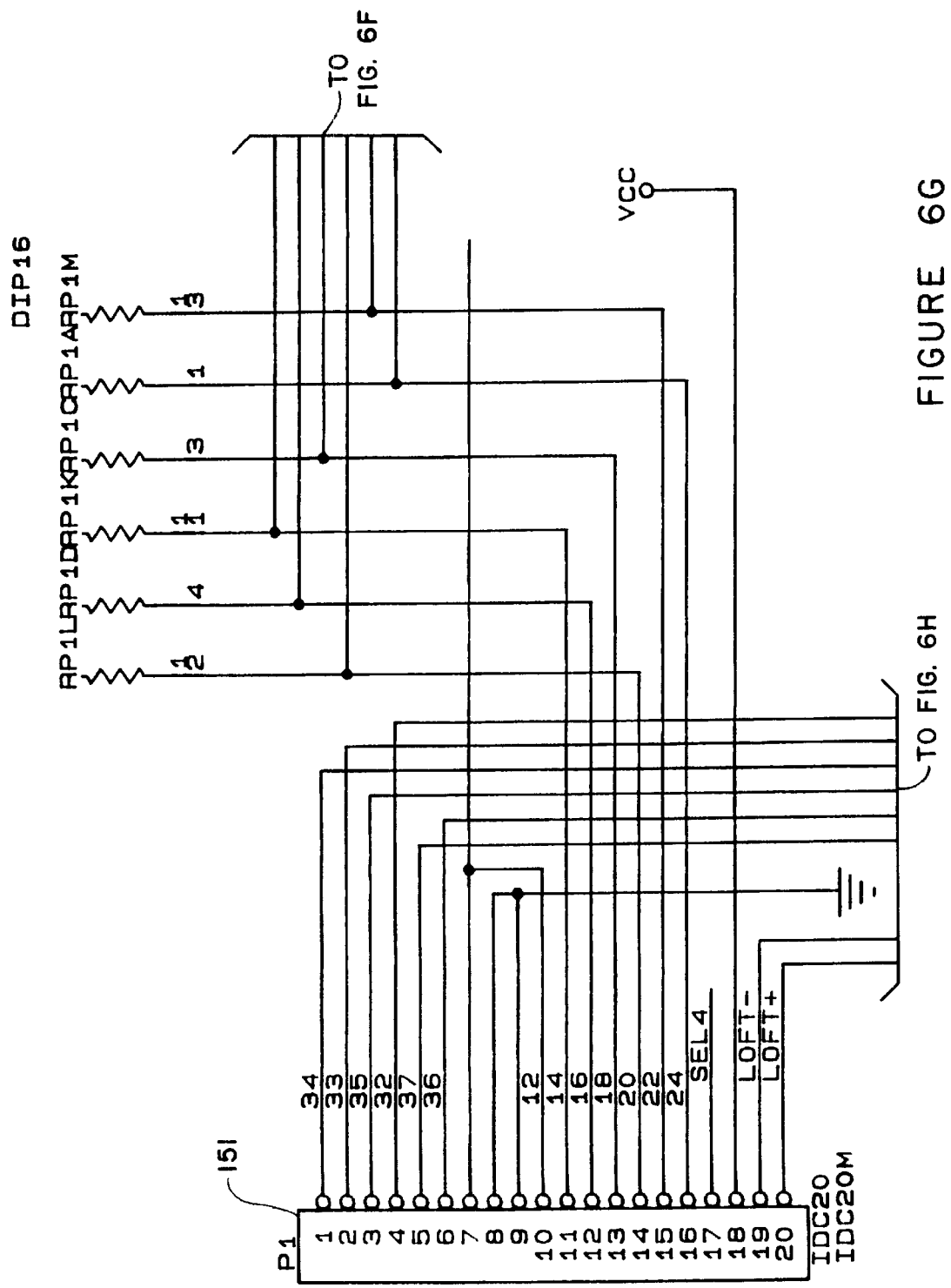
Figure 6H:
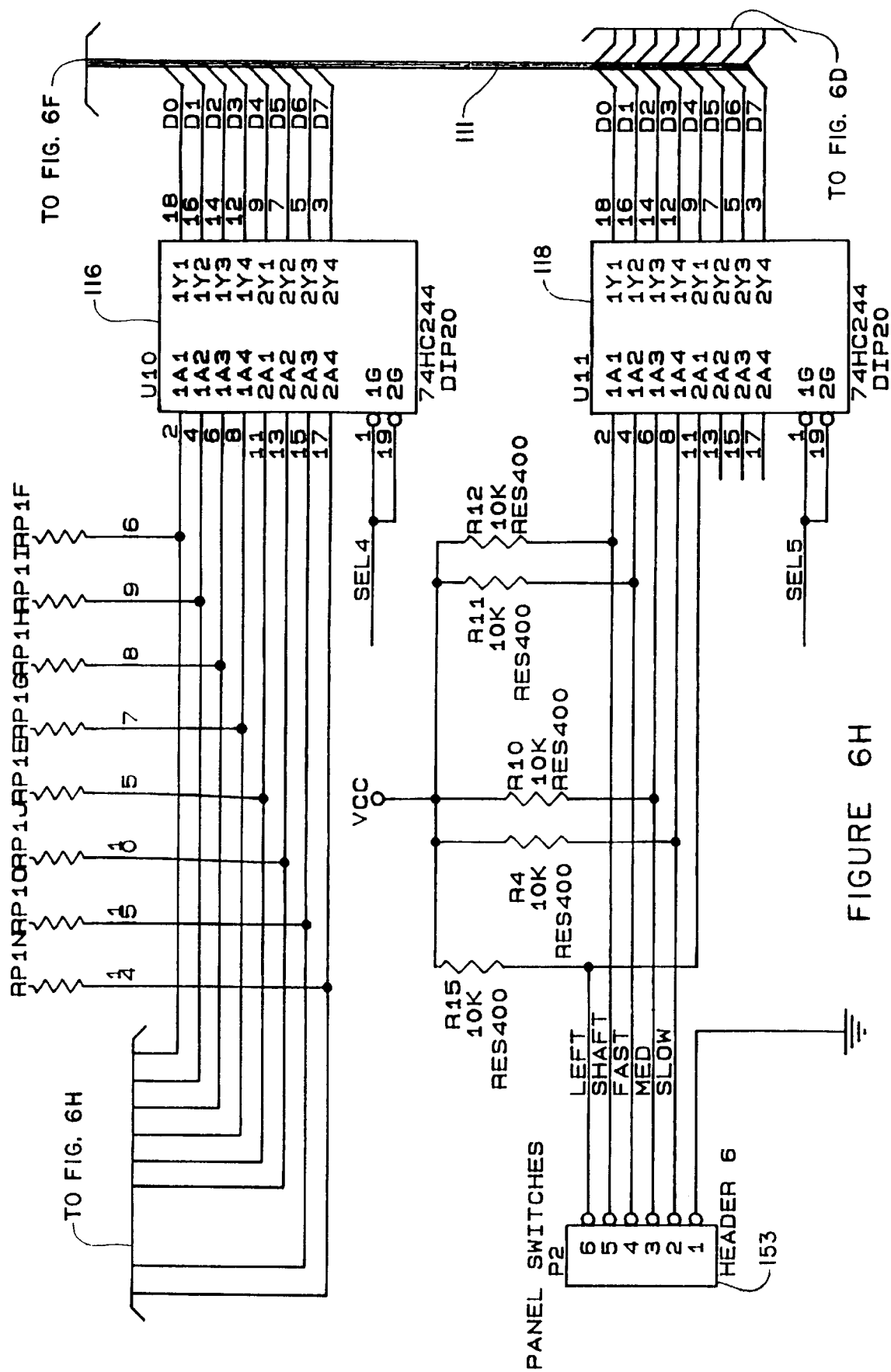
Figure 6I:
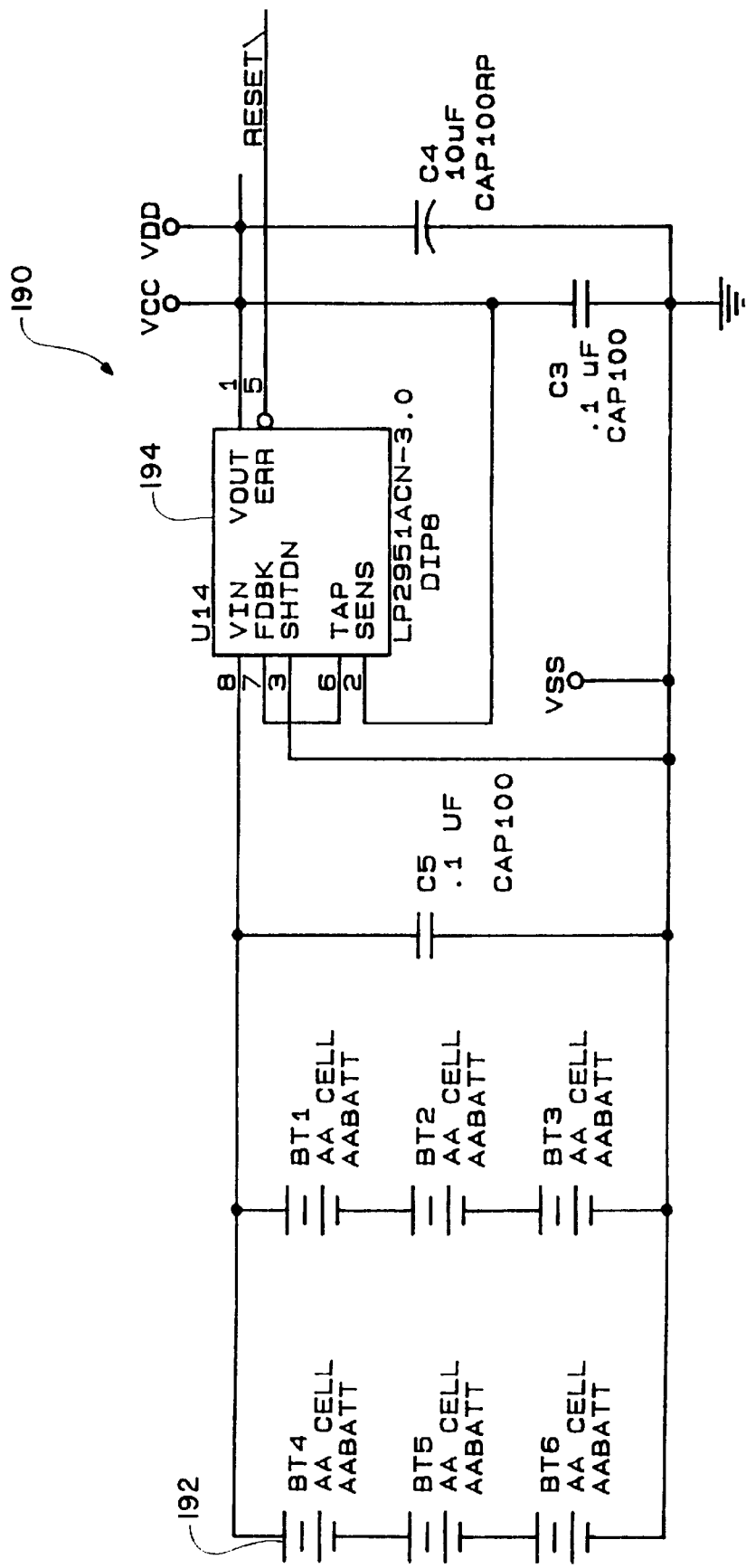

The microcomputer 110 is coupled to the length and lie angle detection circuit by circuitry (not shown), and to the sensor device 90, at an input interface or header 151. The microcomputer 110 cooperates with an I/O select device 112 (FIG. 6E) to process the adjusted length, lie angle and loft angle information for determining desired shaft length, lie angle and loft angle information for the user. The desired length, lie angle and loft angle information is provided to liquid crystal displays (LCDs) 177, 179 and 181 (FIGS. 6A–6C). The desired lie angle, length and loft angle information provided to the LCDs 177, 179 and 181, respectively, appears on the interface 41 as displays 69, 67 and 71 respectively.

The microcomputer 110 and the I/O select device 112 receive the variable information at header 153 coupled to the switches 43, 45, 47, 49 and 51, and enable the bank of LEDs 157 to be displayed on the interface as displays 53, 55, 57, 59, 61, 63 and 65.

Considering now the sensor device 90 in greater detail with reference to FIGS. 4A–4C and 5, the sensor device 90 is disposed within the leg 22 at the shoulder thereof, facing the club 80, and includes a printed circuit board 92 having a pair of optical sensors 94 and 100 secured on opposite sides thereof. The sensors 94 and 100 are disposed on the board 92 at about opposing angles relative to one another. In this regard, the sensor 94 is disposed angularly downwardly while the optical sensor 100 is disposed angularly upwardly. As will be described hereinafter in greater detail, the optical sensors 94 and 100 cooperate with a club face 88 of the club 80 to determine if the adjusted loft angle of the club 80 is either positive, neutral or negative.

Figure 5:
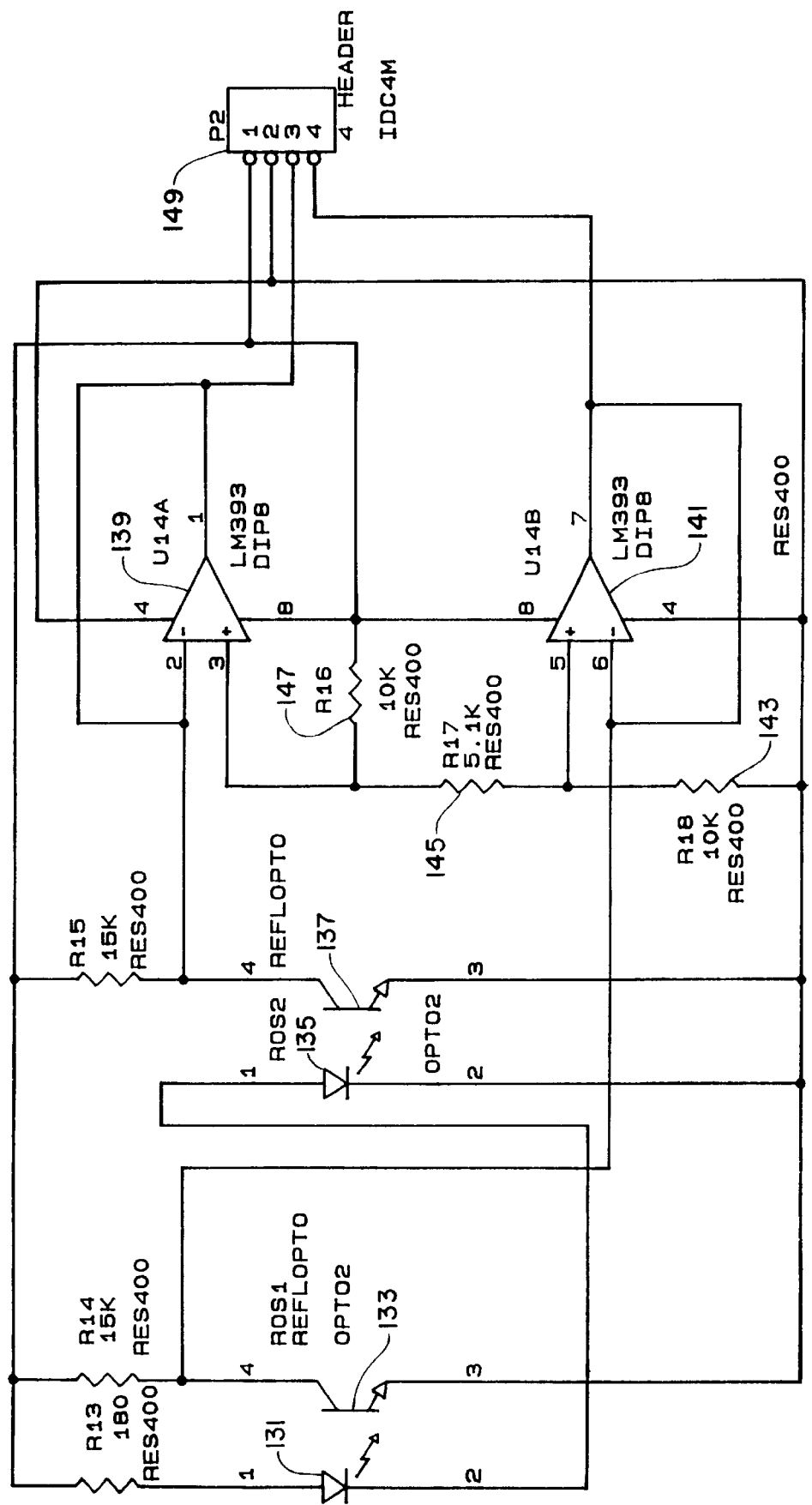
FIG. 5 is a schematic diagram of the optical sensor of FIG. 4A.

Each of the optical sensors 94 and 100 include an emitter portion and a sensor portion, such as the emitter portion 96 and the sensor portion 98 of the optical sensor 94. As shown in FIG. 5, the emitter portions of the optical sensors 94 and 100 include light emitting diodes 131 and 135. The sensor portions of the optical sensors 94 and 100 include phototransistors 133 and 137, respectively, which cooperate with the light emitting diodes 131 and 135, respectively, to ascertain the adjusted loft angle of the club 80. The phototransistors 133 and 137 are coupled to comparators 141 and 139. A reference voltage divider including resistors 143, 145 and 147 is coupled to the comparators 139 and 141 to facilitate the generation of signals indicative of the adjusted loft angle of the club. An interface or header 149 coupled to the comparators 139 and 141 is coupled to the header 151 by circuitry (not shown) to facilitate the transmission of the information indicative of the adjusted loft angle to the microcomputer 110.

Figure 4B:
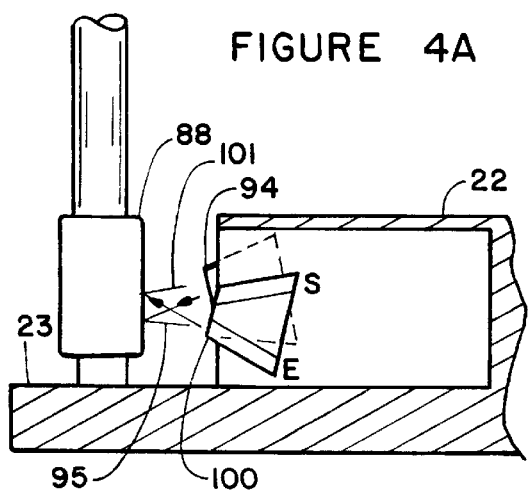
FIG. 4B is a partially cut-away diagrammatic front view of the golf club fitting system of FIG. 1 illustrating the sensor device cooperating with the adjustable golf club in a vertical position.
Figure 4C:
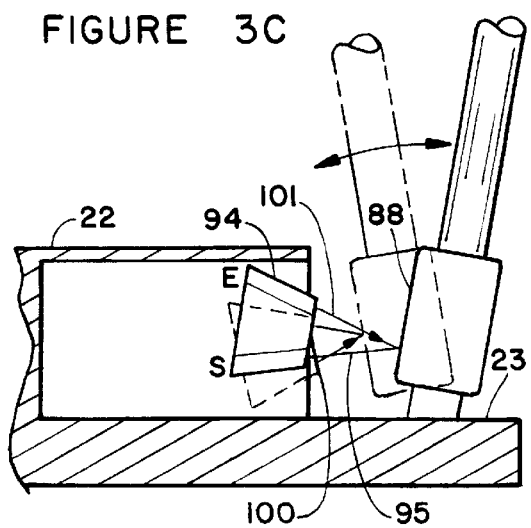
FIG. 4C is a partially cut-away diagrammatic rear view of the system of FIG. 1 illustrating the sensor device cooperating with the adjustable golf club in a rearwardly inclined position and in a forwardly inclined position.

As shown in FIGS. 4B and 4C, the optical sensors 94 and 100 emit light along paths 94 and 101, respectively. The paths 95 and 100 strike the club face 88 and are reflected thereby. When the club head 82, and thus the club face 88, are in a substantially vertically upright position, i.e., the loft angle is neutral, the right paths 95 and 101 are reflected by the club face 88 to the sensor portions of the respective optical sensors 94 and 100. However, when the club face 88 is adjusted to either a negative loft angle as shown in FIG. 4C in solid lines, or to a positive loft angle as shown in dashed lines in FIG. 4C, only one of the light paths 95 and 101 is reflected back to the sensor portion of the respective optical sensor device 94 and 100.

In this regard, when the club face 88 is adjusted to the negative loft angle, the light path 95 is reflected by the club face 88 back to the emitter portion of the optical sensor 94. In this negative loft angle, the club face 88 will not, however, reflect the light path 101 back to the sensor portion of the optical sensor 100.

When the club face 88 is in the positive loft angle, the light path 101 is reflected by the club face 88 to the sensor portion of the optical sensor 100. However, the light path 95 will not be reflected by the club face 88 to the sensor portion of the optical sensor 94. Thus, the detection of the light paths 95 and 101 by the respective optical sensors 94 and 100 enables the adjusted loft angle to be determined to be either a positive loft angle, a neutral loft angle or a negative loft angle.

From the foregoing, it will be understood that the club face 88 is inclined generally vertically in the neutral loft angle position, inclined rearwardly away from the sensors 90 and 100 in the negative loft angle position, and inclined forwardly toward the sensors 90 and 100 in the positive loft angle position.

Considering now the processing and utilization of the adjusted shaft, lie angle and loft angle information by the microcomputer 110 in greater detail with reference to FIGS. 6 and 6A–6I, the adjusted length, lie angle and loft angle information are provided to the microcomputer 110 via the interface 151. The I/O select device 112 selectively enables the adjusted lie angle information to be temporarily placed on a data buss 111 by an input buffer 114 and to selectively enable the adjusted length and adjusted loft angle information (i.e., neutral, positive or negative loft angle) to be temporarily placed on the data buss 111 by an input buffer 116 for processing by the microcomputer 110. Similarly, the I/O select device 112 enables variable information received at interface or header 153 to be temporarily placed on the data buss 111 by an input buffer 118. A latch 155 is enabled by the I/O select device 112 to activate the LEDs 157 as determined by the data buss 111.

The microcomputer 110 utilizes the input variables of playing style, putter style and green speed in addition to the adjusted length, lie angle and loft angle information to determine desired length, lie angle and loft angle information for a desired club according to lookup tables arranged as matrices.

In this regard, the microprocessor 110 utilizes a heel/lie angle table to determine the desired lie angle for a desired club where a heel shafted putter style is selected. A face/lie angle table is provided to determine the desired lie angle for a desired putter where the face balanced putter style is selected. A length table is utilized to determine the desired length information for the desired club.

The microcomputer 110 further utilizes six loft angle tables to determine the desired loft angle for the desired club. Three of the loft angle tables correspond to the selection of a right handed player position, while the other three loft angle tables correspond to the left handed player position being selected.

The three right hand position loft angle tables are divided according to the selected green speed. Thus, there is a table for right hand position and fast green speed, right hand position and medium green speed, and right hand position and slow green speed. Similarly, the three left hand position loft angle tables are also divided according to the selected green speed.

Utilizing the selected player position green speed variables to determine the appropriate left angle table to use, the microcomputer 110 further utilizes the adjusted loft angle information to determine the desired loft angle for the desired club.

The arrangement of the lookup table matrices is particularly suited for the majority of users, and represents the best performance as determined by repeated trial and error evaluation.

In the preferred embodiment, the desired loft angle is selected to be one of three possible desired loft angles. In particular, either a three degree, a four and one-half degree or a six degree loft angle will be selected as the desired loft angle. The three degree, four and one-half degree and six degree loft angles are typical in the golf club industry, and are suitable for the majority of users.

Figure 2:
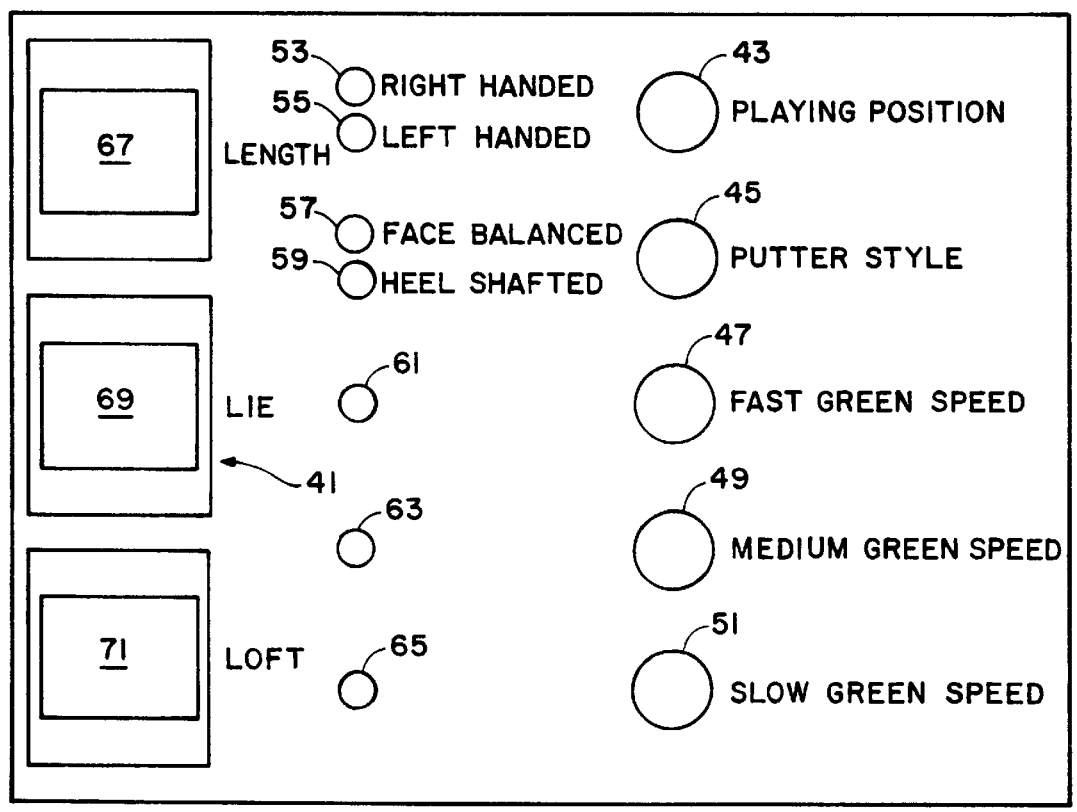
FIG. 2 is a user/computer interface of the system of FIG. 1.

Once the microcomputer 110 has determined the desired lie angle, length and loft angle information, the select device 112 controls NAND gates 160, 162 and 164 to supply the desired lie angle, length and loft angle information to LCD drivers/latches 171, 173 and 175, respectively, to enable the information to be transmitted to the LCDs 177, 179 and 181 and displayed on displays 69, 67 and 71 (FIG. 2).

A power supply 190 provides electrical energy to operate the system 10, and includes a plurality of dry cell batteries, such as dry cell battery 192. In this regard, the dry cell batteries enable the system 10 to be self contained, and portable. However, one skilled in the art will understand that the system 10 can be connected to a standard electrical supply, such as a 120 volt, 60 Hz, power supply by a suitable cord and transformer.

Figure 7:
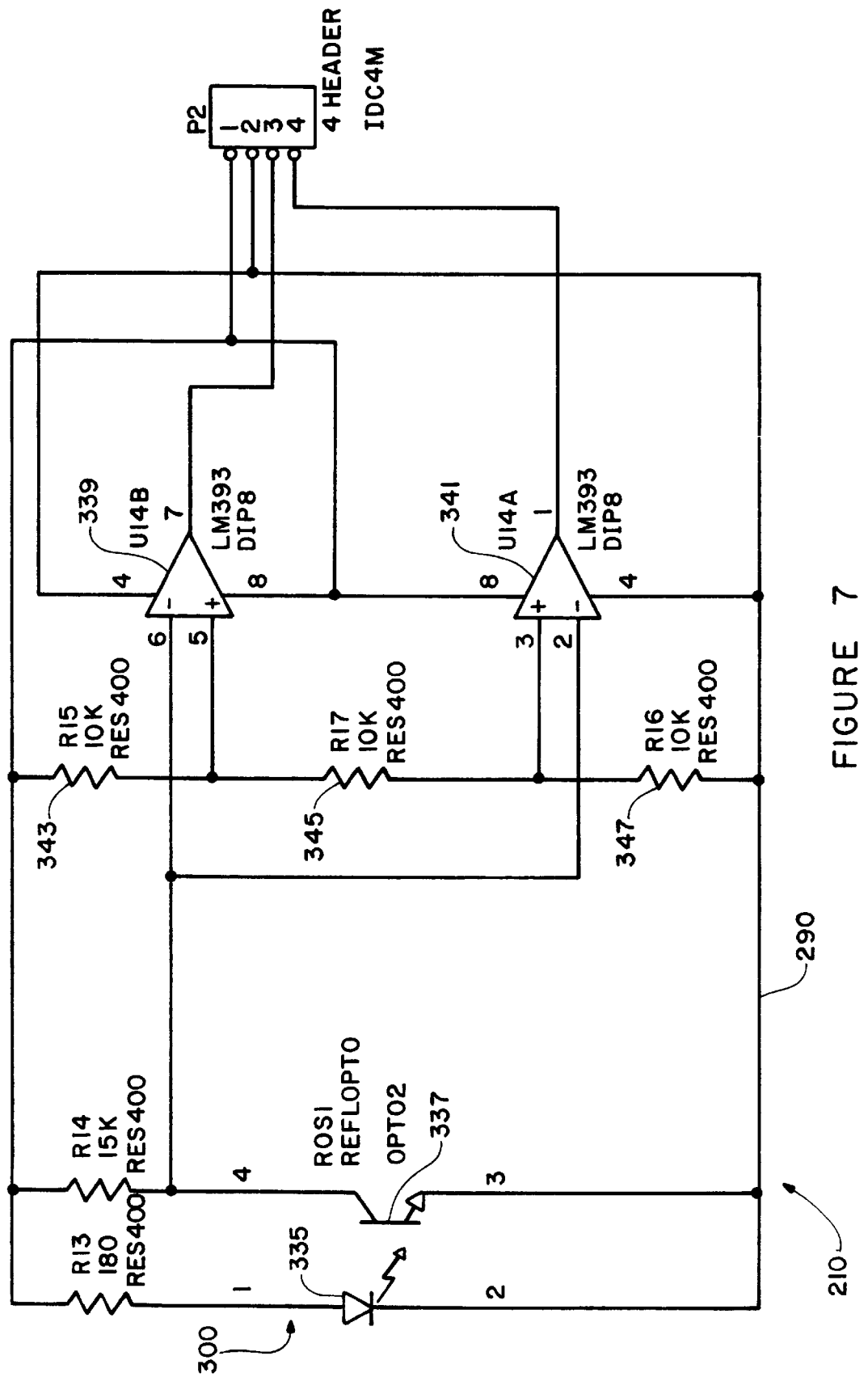
FIG. 7 is a schematic view of another golf club fitting system illustrating another optical sensor used therein, and which is also constructed in accordance with the present invention.

Referring now to FIG. 7, there is shown another golf club fitting system 210, which is also constructed in accordance with the present invention. The system 210 is substantially similar to the system 10 (FIG. 1), except that the sensor device 90 of the system 10 is replaced by a sensor device 290 in the system 210.

Unlike the sensor device 90, the sensor device 290 has only one optical sensor 300. The optical sensor 300 corresponds to the optical sensor 100 (FIG. 4A), and is disposed angularly upwardly. The optical sensor 100 generates a maximum signal when the club is in a forward position (i.e., positive left) and generates a minimum signal when the club is in a back position (i.e., negative loft).

Considering the sensor device 290 in greater detail with reference to FIG. 7, the sensor device 290 includes an emitter, such as light emitting diode 335, that cooperates with a sensor, such as phototransistor 337, to ascertain the adjusted loft angle of the club. The phototransistor 337 is coupled to comparators 339 and 341.

A reference voltage divider including resistors 343, 345 and 347 is coupled to the comparators 339 and 341 set thresholds for the comparators 339 and 341 to facilitate the generation of signals indicative of the adjusted loft angle. In this regard, the resistors 343, 345 and 347 enable: the output of both comparators 339 and 341 to be low when the club is in the forward (positive) position; the output of comparator 341 to be high and the output of comparator 339 to be low when the club is in the neutral position; and to enable the output of both comparators 339 and 341 to be high when the club is in the back (negative) position.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A golf club fitting system, comprising:
   a base adapted to be mounted on a supporting surface;
   an adjustable golf club including a club head having a club face and mounted at one end of a shaft;
   means for mounting rockably said club head on said base for positioning said adjustable golf club in an upright position for enabling the user to grasp the shaft in a playing position at another end thereof and to enable the user to move the club face into an adjusted loft angle desired by the user;
   means for sensing the adjusted loft angle of said club face to generate a signal indicative of the adjusted loft angle;
   means for determining a desired loft angle in response to the sensed adjusted loft angle to generate a signal indicative of the desired loft angle for the user; and
   means for utilizing said signal indicative of the desired loft angle for facilitating the selection of a desired golf club for the user.

2. A system according to claim 1, wherein said means for mounting rockably includes a gimbal assembly.

3. A system according to claim 1, wherein said means for sensing includes an optical sensor.

4. A system according to claim 1, wherein said means for sensing includes a pair of optical sensors.

5. A system according to claim 1, wherein said means for determining the desired loft angle includes a microcomputer.

6. A system according to claim 1, wherein the club shaft is adjustable in length, and further including means for determining an adjusted length of the club shaft to generate a signal indicative thereof.

7. A system according to claim 6, wherein the club head is adjustable angularly relative to the shaft to enable the club head to be moved to an adjustable lie angle, and further including means for generating a signal indicative of the adjusted lie angle.

8. A golf club fitting system, comprising:

a base adapted to be mounted on a supporting surface;

an adjustable golf club including a club head having a club face and mounted at one end of a shaft;

means for mounting rockably said club head on said base for positioning said adjustable golf club in an upright position for enabling the user to grasp the shaft in a playing position at another end thereof and to enable the user to move the club face into an adjusted loft angle desired by the user;

means for sensing the adjusted loft angle of said club face to generate a signal indicative of the adjusted loft angle;

means for determining a desired loft angle in response to the sensed adjusted loft angle to generate a signal indicative of the desired loft angle for the user;

means for utilizing said signal indicative of the desired loft angle for facilitating the selection of a desired golf club for the user; and means for receiving information concerning whether the user is right handed or left handed, and wherein said means for determining the desired loft angle responds to said left handed or right handed information to serve as a variable for determining the desired loft angle.

9. A golf club fitting system, comprising:

a base adapted to be mounted on a supporting surface;

an adjustable golf club including a club head having a club face and mounted at one end of a shaft;

means for mounting rockably said club head on said base for positioning said adjustable golf club in an upright position for enabling the user to grasp the shaft in a playing position at another end thereof and to enable the user to move the club face into an adjusted loft angle desired by the user;

means for sensing the adjusted loft angle of said club face to generate a signal indicative of the adjusted loft angle;

means for determining a desired loft angle in response to the sensed adjusted loft angle to generate a signal indicative of the desired loft angle for the user;

means for utilizing said signal indicative of the desired loft angle for facilitating the selection of a desired golf club for the user; and means for receiving information concerning the intended playing surface, and wherein said means for determining the desired loft angle responds to said playing surface information to serve as another variable for determining said desired loft angle.

10. A golf club fitting system, comprising:

a base adapted to be mounted on a supporting surface;

an adjustable golf club including a club head having a club face and mounted at one end of a shaft;

means for mounting rockably said club head on said base for positioning said adjustable golf club in an upright position for enabling the user to grasp the shaft in a playing position at another end thereof and to enable the user to move the club face into an adjusted loft angle desired by the user;

means for sensing the adjusted loft angle of said club face to generate a signal indicative of the adjusted loft angle;

means for determining a desired loft angle in response to the sensed adjusted loft angle to generate a signal indicative of the desired loft angle for the user;

means for utilizing said signal indicative of the desired loft angle for facilitating the selection of a desired golf club for the user; and means for receiving information indicative of the style of the desired golf club as being either heel shafted or face balanced.

11. A golf club fitting system, comprising:

a base adapted to be mounted on a supporting surface;

an adjustable golf club including a club head having a club face and mounted at one end of a shaft;

means for mounting rockably said club head on said base for positioning said adjustable golf club in an upright position for enabling the user to grasp the shaft in a playing position at another end thereof and to enable the user to move the club face into an adjusted loft angle desired by the user;

means for sensing the adjusted loft angle of said club face to generate a signal indicative of the adjusted loft angle;

means for determining a desired loft angle in response to the sensed adjusted loft angle to generate a signal indicative of the desired loft angle for the user;

means for utilizing said signal indicative of the desired loft angle for facilitating the selection of a desired golf club for the user means for sensing includes a pair of optical sensors; and, wherein one of said optical sensors is directed angularly upwardly toward said club face, and said other optical sensor being directed angularly slightly downwardly toward said club face to determine the position of the club face as being inclined generally vertically, inclined rearwardly away from said means for sensing, or inclined forwardly toward said means for sensing.

12. A golf club fitting system, comprising:

a base adapted to be mounted on a supporting surface;

an adjustable golf club including a club head having a club face and mounted at one end of a shaft;

means for mounting rockably said club head on said base for positioning said adjustable golf club in an upright position for enabling the user to grasp the shaft in a playing position at another end thereof and to enable the user to move the club face into an adjusted loft angle desired by the user;

means for sensing the adjusted loft angle of said club face to generate a signal indicative of the adjusted loft angle;

means for determining a desired loft angle in response to the sensed adjusted loft angle to generate a signal indicative of the desired loft angle for the user;

means for utilizing said signal indicative of the desired loft angle for facilitating the selection of a desired golf club for the user;

wherein said means for determining the desired loft angle includes a microcomputer; and means for receiving information indicative of the user being right handed or left handed, and playing surface condition information, and means for storing said left handed or right handed player information and said playing condition information in said microcomputer.

13. A system according to claim 12, wherein said microcomputer determines the desired loft angle based on variables including the sensed adjusted loft angle, the left handed or right handed user information, and the playing surface condition information.

14. A golf club fitting system, comprising:

a base adapted to be mounted on a supporting surface;

an adjustable golf club including a club head having a club face and mounted at one end of a shaft;

means for mounting rockably said club head on said base for positioning said adjustable golf club in an upright position for enabling the user to grasp the shaft in a playing position at another end thereof and to enable the user to move the club face into an adjusted loft angle desired by the user;

means for sensing the adjusted loft angle of said club face to generate a signal indicative of the adjusted loft angle;

means for determining a desired loft angle in response to the sensed adjusted loft angle to generate a signal indicative of the desired loft angle for the user;

means for utilizing said signal indicative of the desired loft angle for facilitating the selection of a desired golf club for the user;

wherein said means for determining the desired loft angle includes a microcomputer; and means for receiving information indicative of the style of the desired golf club as being either heel shafted or face balanced, and means for storing said style information.

15. A system according to claim 14, wherein said microcomputer determines a desired lie angle for the desired golf club.

16. A method of fitting a golf club to a user, comprising:

using an adjustable golf club rockably mounted on a base;

grasping the shaft of the golf club by the user;

moving the club head to an adjusted position to suit the playing style of the user;

sensing the adjusted loft angle of the club face;

generating an electrical signal indicative of the adjusted loft angle;

utilizing the signal indicative of the desired loft angle.

17. A method of fitting a golf club to a user, comprising:

using an adjustable golf club rockably mounted on a base;

grasping the shaft of the golf club by the user;

moving the club head to an adjusted position to suit the playing style of the user;

sensing the adjusted loft angle of the club face;

generating an electrical signal indicative of the adjusted loft angle;

utilizing the signal indicative of the desired loft angle; and receiving information concerning whether the user is right handed or left handed, and wherein said determining the desired loft angle responds to said left handed or right handed information to serve as a variable for determining the desired loft angle.

18. A method of fitting a golf club to a user, comprising:

using an adjustable golf club rockably mounted on a base;

grasping the shaft of the golf club by the user;

moving the club head to an adjusted position to suit the playing style of the user;

sensing the adjusted loft angle of the club face;

generating an electrical signal indicative of the adjusted loft angle;

utilizing the signal indicative of the desired loft angle; and receiving information concerning the intended playing surface, and wherein said determining the desired loft angle responds to said playing surface information to serve as another variable for determining said desired loft angle.

19. A method of fitting a golf club to a user, comprising:

using an adjustable golf club rockably mounted on a base;

grasping the shaft of the golf club by the user;

moving the club head to an adjusted position to suit the playing style of the user;

sensing the adjusted loft angle of the club face;

generating an electrical signal indicative of the adjusted loft angle;

utilizing the signal indicative of the desired loft angle; and receiving information indicative of the style of the desired golf club as being either heel shafted or face shafted.

20. A golf club fitting system, comprising:

a base adapted to be mounted on a supporting surface;

means for mounting a golf club movably in an upright position on said base, said golf club having a shaft and a club head having a face;

means for sensing the position of the club head relative to said base when the user positions the club in the desired playing position to generate measurement information to help determine desired golf club construction parameters;

means for receiving variable information relating to user generated requirements for the desired golf club construction parameters; and means responsive to said measurement information and said variable information for determining the desired golf club construction parameters suitable for use by the user.

21. A golf club fitting system according to claim 20, wherein said means for determining includes a microcomputer.

22. A golf club fitting system according to claim 21, wherein said microprocessor stores said measurement information and said variable information in the form of tables arranged in matrices to determine the desired golf club construction parameters.

* * * * *